United States Patent
Choi et al.

(10) Patent No.: US 10,506,533 B2
(45) Date of Patent: Dec. 10, 2019

(54) METHOD AND DEVICES FOR HYBRID SCANNING IN WIRELESS ACCESS SYSTEM SUPPORTING MILLIMETER WAVES

(71) Applicant: LG ELECTRONICS INC., Seoul (KR)

(72) Inventors: Kukheon Choi, Seoul (KR); Jaehoon Chung, Seoul (KR); Genebeck Hahn, Seoul (KR); Eunjong Lee, Seoul (KR); Jinmin Kim, Seoul (KR); Kwangseok Noh, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 180 days.

(21) Appl. No.: 15/550,757

(22) PCT Filed: Feb. 13, 2015

(86) PCT No.: PCT/KR2015/001472
§ 371 (c)(1),
(2) Date: Aug. 11, 2017

(87) PCT Pub. No.: WO2016/129725
PCT Pub. Date: Aug. 18, 2016

(65) Prior Publication Data
US 2018/0049141 A1 Feb. 15, 2018

(51) Int. Cl.
*H04L 5/00* (2006.01)
*H04W 56/00* (2009.01)
(Continued)

(52) U.S. Cl.
CPC ............ *H04W 56/001* (2013.01); *H04B 3/10* (2013.01); *H04B 7/0617* (2013.01);
(Continued)

(58) Field of Classification Search
CPC ....... H04W 56/001; H04B 7/086; H04B 3/10; H04L 5/0048; H04L 27/3455; H04L 27/3836
See application file for complete search history.

(56) References Cited

U.S. PATENT DOCUMENTS

2013/0229309 A1 9/2013 Thomas et al.
2013/0301563 A1* 11/2013 Gupta .................. H04L 5/0048
370/329

(Continued)

FOREIGN PATENT DOCUMENTS

KR 1020150015447 2/2015

OTHER PUBLICATIONS

Zoli, Marco, "Performance Analysis of Ray-Tracing Assisted Beamforming Techniques for Future mm-wave Wireless Systems", Oct. 28, 2014, pp. 1-43 (Year: 2014).*

(Continued)

*Primary Examiner* — Salvador E Rivas
(74) *Attorney, Agent, or Firm* — Lee Hong Degerman Kang Waimey

(57) ABSTRACT

The present invention provides a method for hybrid scanning to reduce overhead in a beam scanning scheme in a millimeter wave (mmWave) system, and devices supporting same. The method for hybrid scanning in a wireless access system supporting millimeter wave technology, according to one embodiment of the present invention, comprises the steps of: receiving a synchronization signal to synchronize with a base station; synchronizing with the base station using the synchronization signal; receiving, from the base station, first pilot signals having different configuration patterns according to each transmitting antenna; ray-scanning using the first pilot signals; selecting a candidate beamforming port set through the ray-scanning; generating second pilot signals having different configuration patterns (Continued)

according to each beamforming port included in the candidate beamforming port set; and transmitting, to the base station, the second pilot signals to perform beam scanning with the base station.

8 Claims, 11 Drawing Sheets

(51) Int. Cl.
| | | |
|---|---|---|
| *H04B 3/10* | (2006.01) | |
| *H04B 7/06* | (2006.01) | |
| *H04W 16/06* | (2009.01) | |
| *H04W 28/02* | (2009.01) | |
| *H04B 7/08* | (2006.01) | |
| *H04L 27/34* | (2006.01) | |
| *H04L 27/38* | (2006.01) | |
| *H04W 88/02* | (2009.01) | |
| *H04W 88/08* | (2009.01) | |

(52) U.S. Cl.
CPC ............ *H04B 7/0695* (2013.01); *H04B 7/088* (2013.01); *H04L 5/0048* (2013.01); *H04W 16/06* (2013.01); *H04W 28/0289* (2013.01); *H04W 56/0015* (2013.01); *H04L 5/005* (2013.01); *H04L 27/3455* (2013.01); *H04L 27/3836* (2013.01); *H04W 88/02* (2013.01); *H04W 88/08* (2013.01)

(56) References Cited

U.S. PATENT DOCUMENTS

| | | |
|---|---|---|
| 2013/0315321 A1 | 11/2013 | Rajagopal et al. |
| 2014/0056381 A1 | 2/2014 | Wang |
| 2017/0238222 A1* | 8/2017 | Jiang .................... H04W 36/08 370/331 |
| 2018/0034500 A1* | 2/2018 | Choi ........................ H04B 7/04 |

OTHER PUBLICATIONS

PCT International Application No. PCT/KR2015/001472, Written Opinion of the International Searching Authority dated Nov. 23, 2015, 15 pages.

\* cited by examiner

Time taken for UE having predetermined
bandwidth for one BS beam direction
to perform scanning in all directions Transmit pilot with determined Rx beam
and determine Tx beam (a) indoor AOA measurement (b) corridor AoA measurement Tx/Rx distance : 77m (b)

(a) PAS change according to beam width[3]

(b) RMS DS change by directional antenna[4]

METHOD AND DEVICES FOR HYBRID SCANNING IN WIRELESS ACCESS SYSTEM SUPPORTING MILLIMETER WAVES

CROSS-REFERENCE TO RELATED APPLICATIONS

This application is the National Stage filing under 35 U.S.C. 371 of International Application No. PCT/KR2015/001472, filed on Feb. 13, 2015, the contents of which is hereby incorporated by reference herein in its entirety.

TECHNICAL FIELD

The present invention relates to a wireless access system, and more particularly, to a method of performing hybrid scanning and apparatus therefor, suitable for reducing overhead of a beam scanning scheme in a millimeter wave (mmWave) system.

BACKGROUND ART

Wireless access systems have been widely deployed to provide various types of communication services such as voice or data services. Generally, a wireless access system is a multiple access system capable of supporting communication with multiple users by sharing available system resources (bandwidth, transmit power, etc.). Multiple access systems include, for example, a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

When an existing beamforming method applies to an mmWave system used on high frequency band, it may cause a problem that a considerably long time delay is generated from a beam searching and a problem that unique channel property of a radio channel cannot be obtained. Moreover, there is a problem that an existing ray scanning method is applicable to a system having a small cell size only.

DISCLOSURE OF THE INVENTION

Technical Task

The present invention is devised to solve the above problems, and one technical task of the present invention is to provide an efficient data transceiving method in an mmWave system.

Another technical task of the present invention is to provide a method of performing a hybrid scanning to reduce overhead attributed to performing an existing beam scanning method.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

The present invention provides a method of performing a hybrid scanning to receive overhead of a beam scanning scheme in a millimeter wave (mmWave) system and apparatuses for supporting the same.

In one technical aspect of the present invention, provided herein is a method of performing a hybrid scanning in a wireless access system supportive of a millimeter wave technology, including receiving a synchronization signal to match synchronization with a base station, matching the synchronization with the base station using the synchronization signal, receiving first pilot signals having different configuration patterns per transmitting antenna port from the base station, performing a ray scanning using the first pilot signals, selecting a candidate beamforming port set through the ray scanning, generating second pilot signals having different configuration patterns per candidate beamforming port included in the candidate beamforming port set, and transmitting the second pilot signals to the base station to perform a beam scanning with the base station.

In another technical aspect of the present invention, provided herein is a user equipment performing a hybrid scanning in a wireless access system supportive of a millimeter wave technology, including a receiver, a transmitter, and a processor configured to support the hybrid scanning.

In this case, the processor may be further configured to receive a synchronization signal to match synchronization with a base station by controlling the receiver, match the synchronization with the base station using the synchronization signal, receive first pilot signals having different configuration patterns per transmitting antenna port from the base station by controlling the receiver, perform a ray scanning using the first pilot signals, select a candidate beamforming port set through the ray scanning, generate second pilot signals having different configuration patterns per candidate beamforming port included in the candidate beamforming port set, and transmit the second pilot signals to the base station to perform a beam scanning with the base station.

The first pilot signals may be multiplexed with a pilot index for generating the second pilot signals and a resource pool index indicating a resource region carrying the second pilot signals.

The second pilot signals may be transmitted to the base station through the resource region indicated by the resource pool index.

The first pilot signals may be transmitted in form of repetition.

The second pilot signals may be transmitted in form of repetition.

The above aspects of the present invention are just parts of preferred embodiments of the present invention, and various embodiments reflecting the technical features of the present invention can be derived and understood from the following description by those having ordinary skill in the technical field to which the present invention pertains.

Advantageous Effects

According to embodiments of the present invention, the following effects are provided.

First of all, using the present invention, data can be efficiently transceived in an mmWave system.

Secondly, using a hybrid scanning scheme, it is able to reduce overhead attributed to performing an existing beam scanning scheme.

Effects obtainable from the present invention are non-limited by the above mentioned effect. And, other unmentioned effects can be clearly understood from the following description by those having ordinary skill in the technical field to which the present invention pertains. Namely, effects unintended in implementing the present invention can be derived from the embodiments of the present invention by those having ordinary skill in the technical field to which the present invention pertains as well.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. And, the accompanying drawings are used to describe embodiments of the present invention together with the detailed description.

BEST MODE FOR INVENTION

Figure 1:
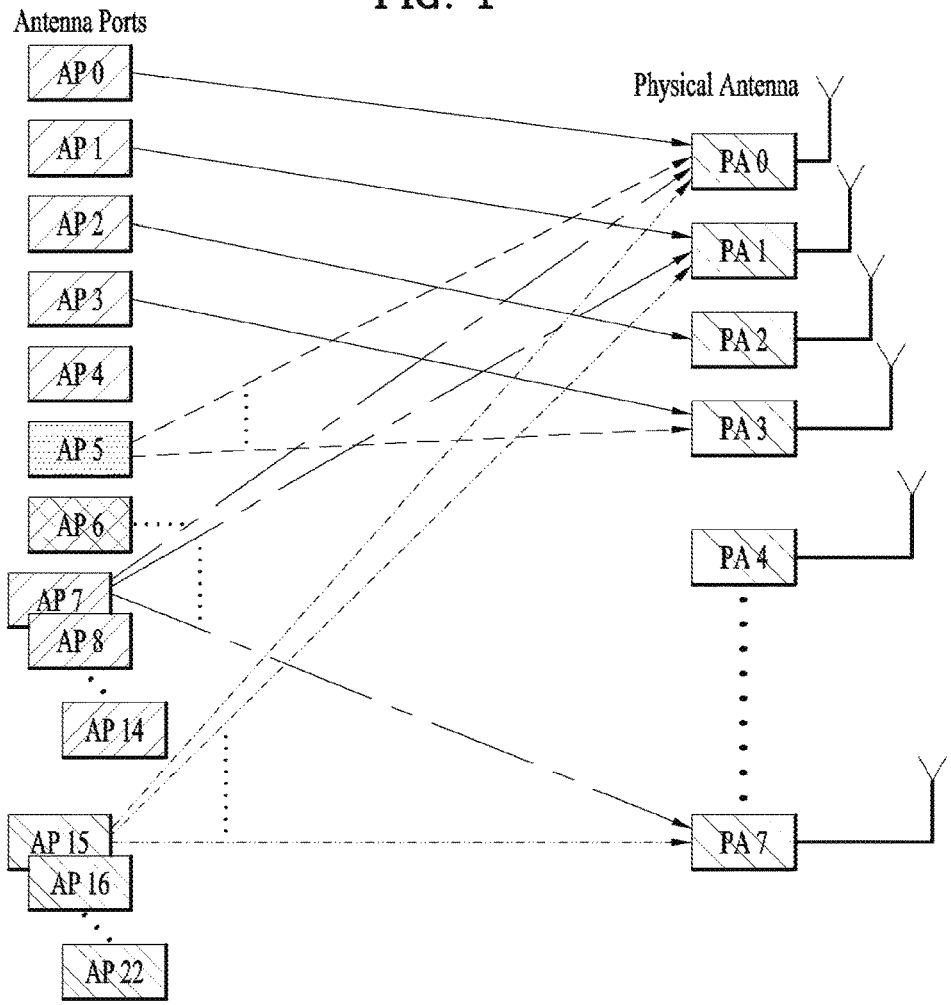
FIG. 1 is a diagram showing one example of an antenna port used in mmWave.

The following embodiments of the present invention described in detail provide a method of performing a hybrid scanning to receive overhead of a beam scanning scheme in a millimeter wave system and apparatuses for supporting the same.

The following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

In the description of the drawings, procedures, steps and the like that may obscure the concept of the present invention are not described and procedures or steps on the level understandable by those skilled in the art are not described as well.

In the whole specification, if a prescribed part 'comprises or includes' a prescribed component, this means that other components can be further included instead of excluding them unless a presence of especially opposed description. A term such as '~part', '~unit', 'module' and the like means a unit for processing at least one function or operation, which can be implemented by hardware, software or combination of hardware and software. Moreover, 'a or an', 'one', 'the' and similar related terms can be used as the meaning of including the singular and the plural both unless differently indicated in the present specification or clearly refuted by context.

In this specification, embodiments of the present invention are described centering on the data transmission/reception relations between a base station and a mobile station. In this case, the base station may be meaningful as a terminal node of a network which directly performs communication with the mobile station. In this disclosure, a specific operation explained as performed by a base station may be performed by an upper node of the base station in some cases.

In particular, in a network constructed with a plurality of network nodes including a base station, it is apparent that various operations performed for communication with a mobile station can be performed by a base station or other networks except the base station. Herein, 'base station (BS)' may be substituted with such a terminology as a fixed station, a Node B, an eNode B (eNB), an advanced base station (ABS), an access point (AP) or the like.

In the embodiments of the present invention, a terminal may be substituted with such a terminology as a user equipment (UE), a mobile station (MS), a subscriber station (SS), a mobile subscriber station (MSS), a mobile terminal, an advanced mobile station (AMS), or the like.

A transmitting end means a fixed and/or mobile node providing a data or voice service and a receiving end means a fixed and/or mobile node receiving a data or voice service. Hence, a mobile station and a base station may become a transmitting end and a receiving end in uplink, respectively. Likewise, a mobile station and a base station may become a receiving end and a transmitting end, respectively.

Embodiments of the present invention may be supported by the disclosed standard documents of at least one of wireless access systems including IEEE 802.xx system, 3GPP ($3^{rd}$ generation partnership project) system, 3GPP LTE system, and 3GPP2 system. Particularly, the embodiments of the present invention can be supported by documents of 3GPP TS 36.211, 3GPP TS 36.212, 3GPP TS 36.213, 3GPP TS 36.321 and 3GPP TS 36.331. In particular, the steps or parts, which are not explained to clearly reveal the technical idea of the present invention, in the embodiments of the present invention may be supported by the above documents. Moreover, all terminologies disclosed in this document may be supported by the above standard documents.

Reference will now be made in detail to the preferred embodiments of the present invention, examples of which are illustrated in the accompanying drawings. Detailed description disclosed together with the accompanying drawings is intended to explain not a unique embodiment of the present invention but an exemplary embodiment of the present invention.

Specific terminologies used for the following description may be provided to help the understanding of the present invention. And, the use of the specific terminology may be modified into other forms within the scope of the technical idea of the present invention.

For instance, a cellular system may mean an LTE or LTE-A system, and an mmWave system may mean a system supportive of mmWave in the LTE or LTE-A system. Namely, the mmWave system means a wireless access system supportive of mmWave property. Moreover, a term called 'ray' in the embodiments of the present invention may mean a unique signal generated from mmWave link or a cluster of unique signals in case of not performing beamforming.

3GPP LTE/LTE-A system as one example of a wireless access system usable for embodiments of the present invention is described as follows.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like.

CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc.

UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) system is an evolved version of 3GPP LTE system. To clarify the description of the technical features of the present invention, the description is made centering on 3GPP LTE/LTE-A system and may apply to IEEE 802.16e/m system and the like as well.

1. Millimeter Wave (mmWave)

The present invention relates to a signal transceiving method for detection of site specific ray property information unique to mmWave link and detection of abundant resolvable ray and apparatuses supporting the same. Due to an existing short mmWave cell range, it is essential to perform a beamforming for obtaining a transceiving antenna beam gain. Hence, a beamforming based beam scanning scheme has been proposed as an mmWave scanning scheme as well. Yet, such technologies have disadvantage that a transceiving scanning delay increases due to overhead according to a beam scanning.

A ray scanning scheme proposed by the present invention is effective in reducing a large overhead according to a beam scanning scheme by detecting a unique feature of an mmWave environment. Moreover, since information attributed to a transceived beam scanning of a user equipment is not unique property information (e.g., PDP (power delay profile, PAS (power azimuth spectrum, etc.) of channel, it can be used for acquisition and application of information unique to a channel.

1.1 Antenna Port

FIG. 1 is a diagram showing one example of an antenna port used in mmWave.

An antenna port is a virtual concept for a physical antenna. An output outputted through an antenna port should include a reference signal (RS). As an output outputted through a single antenna port includes an RS, it may be regarded as an antenna stream unit that can be received in a manner that a user equipment detects the RS and then estimates a channel.

Hence, no matter whether a single antenna stream is transmitted through two or more physical antennas or several physical antennas by spatial precoding (i.e., one of transmission beamforming), a user equipment can perform a reception by assuming a single antenna port.

Referring to FIG. 1, a physical antenna is configured by a separate mapping to an antenna port, and mapping between a physical antenna and an antenna port is determined according to a vender. Hence, it is unnecessary to consider an implementation problem of a physical antenna, but descriptions of a method of transmitting a signal or data per antenna port are taken into consideration.

1.2 Antenna Port Configuration of LTE System

The following Table 1 shows antenna ports used for physical channels and signals.

TABLE 1

| Physical channel or signal | Index $\tilde{p}$ | Antenna port number p as a function of the number of antenna ports configured for the respective physical channel/signal | | |
|---|---|---|---|---|
| | | 1 | 2 | 4 |
| PUSCH | 0 | 10 | 20 | 40 |
| | 1 | — | 21 | 41 |
| | 2 | — | — | 42 |
| | 3 | — | — | 43 |
| SRS | 0 | 10 | 20 | 40 |
| | 1 | — | 21 | 41 |
| | 2 | — | — | 42 |
| | 3 | — | — | 43 |
| PUCCH | 0 | 100 | 200 | — |
| | 1 | — | 201 | — |

1.2.1 Precoding

A precoder of a transmitting end takes a block vector $[y^{(0)}(i) \ldots y^{(v-1)}(i)]^T$, $i=0, 1, \ldots, M_{symb}^{layer}-1$ as an input from a transmitting precoder and generates a block vector $[z^{(0)}(i) \; z^{(P-1)}(i)]^T$, $i=0, 1, \ldots, M_{symb}^{ap}-1$ mapped to resource elements.

Regarding the precoding for transmission on a single antenna port, the precoding is defined as $z^{(0)}(i)=y^{(0)}(i)$. Herein, $i=0, 1, \ldots, M_{symb}^{ap}-1$ and $M_{symb}^{ap}=M_{symb}^{layer}$.

The precoding for spatial multiplexing is only used together with a layer mapping for spatial multiplexing. Spatial multiplexing supports antenna port P=2 or P=4, and antenna port sets used for spatial multiplexing includes p∈{20,21} and p∈{40,41,42,43}, respectively.

Precoding for spatial multiplexing is defined as $$\begin{bmatrix} z^{(0)}(i) \\ z^{(P-1)}(i) \end{bmatrix} = W \begin{bmatrix} y^{(0)}(i) \\ y^{(v-1)}(i) \end{bmatrix}.$$

Herein, $i=0, 1, \ldots, M_{symb}^{ap}-1$ and $M_{symb}^{ap}=M_{symb}^{layer}$.

A precoding matrix W having a size P×v for an antenna port P=2 is given by one of the entries shown in Table 2.

TABLE 2

| Codebook index | Number of layers | |
|---|---|---|
| | υ = 1 | υ = 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | — |
| 2 | $\frac{1}{\sqrt{2}}\begin{bmatrix}1\\j\end{bmatrix}$ | — |
| 3 | $\frac{1}{\sqrt{2}}\begin{bmatrix}1\\-j\end{bmatrix}$ | — |
| 4 | $\frac{1}{\sqrt{2}}\begin{bmatrix}1\\0\end{bmatrix}$ | — |
| 5 | $\frac{1}{\sqrt{2}}\begin{bmatrix}0\\1\end{bmatrix}$ | — |

A precoding matrix W having a size P×v for an antenna port P=4 is given by one of the entries shown in Table 3. In Table 3, each row is represented in order of increasing a codebook index from the left to the right. Table 3 shows a case that v is 1. If v is 2 to 4, Tables 5.3.3A.2-3 to 5.3.3A2-5 of TS36.211 v12.3 specifications are referred to.

TABLE 3

| Codebook index | Number of layers υ = 1 | | | | | | | |
|---|---|---|---|---|---|---|---|---|
| 0-7 | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ | $\frac{1}{2}\begin{bmatrix}1\\j\\1\\-j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ |
| 8-15 | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ | $\frac{1}{2}\begin{bmatrix}1\\-j\\1\\j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ |
| 16-23 | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ |

1.2.2 Mapping for Physical Resource

Regarding each antenna port p used for PUSCH (Physical Uplink Shared Channel) transmission in a subframe, a block $z^{(\tilde{p})}(0), \ldots, z^{(\tilde{p})}(M_{symb}^{ap}-1)$ of complex symbols should be multiplied by an amplitude scaling factor $\beta_{PUSCH}$ to secure a transmit power $P_{PUSCH}$, mapped to a sequence starting with $z^{(\tilde{p})}(0)$ for physical resource blocks for the antenna port p, and is assigned for PUSCH transmission. Relation between an index $\tilde{p}$ and an antenna port p is given by Table 1. Mapping for a resource element corresponding to a physical resource block for transmission starts from a first slot of a corresponding subframe and is mapped in increasing order of index 1 after index k.

Moreover, regarding mapping for a resource element (k, l) corresponding to a physical resource block; (1) it is not used for transmission of a reference source; (2) if a user equipment performs SRS transmission in a specific subframe, it is not mapped to a last SC-FDMA symbol of a corresponding subframe; (3) if PUSCH transmission overlaps with a cell-specific SRS bandwidth partially or fully, it is not mapped to a last SC-FDMA symbol within a subframe configured with a corresponding cell-specific SRS; (4) it is not mapped to a part of SC-FDMA symbol reserved for SRS transmission possible in UE-specific aperiodic SRS subframe; and (5) if UE is configured with multiple TAG, it is not mapped to a port of SC-FDMA symbol reserved for possible SRS transmission in UE-specific periodic SRS subframe within a specific serving cell.

For details of physical resource mapping for antenna port p, Paragraph 5.3.4 of v12.1 version of 3GPP TS36.211 specifications can be referred to.

1.3 Cell Search (Measurement, Evaluation, Detection) Method

A term 'cell search' in the embodiments of the present invention is a collective term that means a combination of measurement, evaluation and detection processes. Since a cell search is a process that is performed in the first place by a user equipment before making a cell selection, it is very closely associated with a cell selection process. Moreover, a cell search process considerably affects energy consumption of a user equipment in idle mode.

As a term used for a cell search, a DRX cycle is a sort of a timer. A measurement/evaluation/detection process is performed during a period specified as the number of DRX cycle. In case of an idle mode, DRX cycle is determined from a network through SIB 1 message.

Although a term 'scan' is not specified explicitly in specification documents, most of user equipments perform this process. This process is a tuning process for a specific frequency and a simplest signal quality (e.g., RSSI, etc.) measurement procedure. Generally, a user equipment performs a scan process before an evaluation process and then selects 'small candidate number' to perform a next process (e.g., measurement, evaluation). If the user equipment directly performs the measurement and evaluation processes on all possible frequencies and bands, it will experience too much time consumption and serious power consumption.

'Measurement' process is a process for measuring RSRP and RSRQ and is performed for all non-serving cell measurements according to the definitions specified in 36.133 of LTE/LTE-A specifications. 'Evaluation' process is a process for checking a cell selection reference based on a result of the 'measurement' process. 'Detection' process is a process is a tuning and synchronization process of a specific frequency and a process for decoding basic information of cells.

In the following description, one example of an initial scan and cell search process for WCDMA system is described. WCDMA system is a previous version of LTE/LTE-A system and the following description is applicable to LTE/LTE-A system as well.

If a power of a user equipment is initially turned on or the user equipment is out of a cell coverage, the user equipment performs a detection and search on a new cell. Since the user equipment is not aware of camping on a prescribed frequency of a prescribed cell, it should perform blind decoding. For instance, assume a case that the user equipment supports WCDMA band I. In this case, a base station near the user equipment can use frequency channels 10562 to 10838. Namely, the user equipment can use 176 possible frequencies.

On this assumption, the user equipment measures RSSI for each of all channels supported first. The RSSI is a measurement value that can be measured for any of energy/power by the user equipment. RSSI measurement does not require a channel coding process. Hence, it is not necessary for the user equipment to be aware of anything about a network. Namely, it is not necessary for the user equipment to decode PCPICH in WCDMA system or a sync/reference signal in LTE system. It is enough for the user equipment to measure a power of each channel only. By measuring RSSI for each channel, the user equipment can create a list of each channel number having the measured RSSI.

Subsequently, the user equipment assorts channels having RSSI higher than a threshold using the created list of the channel numbers. The user equipment then performs next steps to find a candidate appropriate for camping on.

The user equipment detects a physical cell identifier by decoding the PCPICH or the sync/reference signal and measures power. The user equipment makes a candidate cell list for the detected physical cell identifiers.

Based on the made candidate cell identifier list, the user equipment decodes MIB for all candidate cells.

Based on USIM information and the candidate cell list, the user equipment checks what kind of a cell is most appropriate for camping on actually and performs a system information and registration process.

1.4 Problems of mmWave

An existing ray scanning scheme has a small cell boundary due to the omniantenna property of mmWave and a resolvable ray is eventually detected from a small cell area only. Hence, how to raise the probability of detection of a resolvable ray without the help of a beamforming gain on ray scanning is a major problem. Moreover, since an mmWave link sensitively changes in a link environment according to a location environment of a user equipment, acquisition of site-specific initial environment information is a major problem as well.

Figure 2:
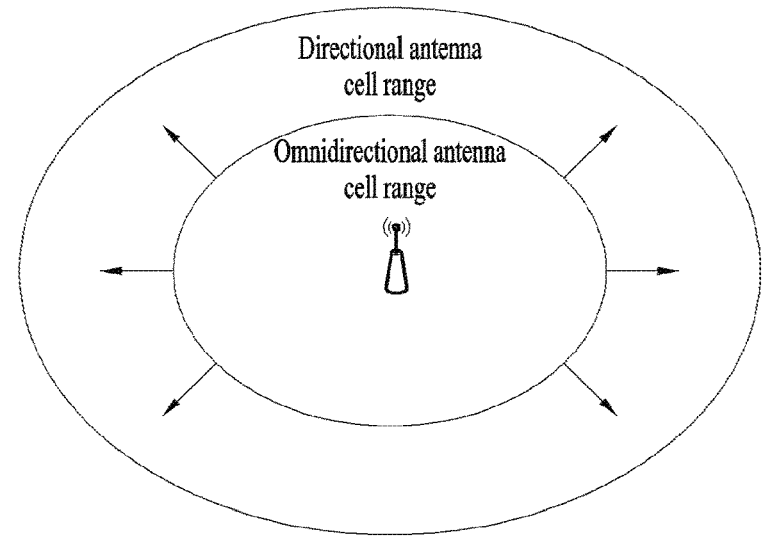
FIG. 2 is a diagram showing one example of cell radiuses that can be covered by an omnidirectional antenna and a directional antenna, respectively.

FIG. 2 is a diagram showing one example of cell radiuses that can be covered by an omnidirectional antenna and a directional antenna, respectively.

Referring to FIG. 2, a range of a cell covered by an omnidirectional antenna is wider than a cell range covered by a directional antenna. When a directional antenna is used in mmWave, there is a problem that a range gain of a beamforming is reduced by about −20 dB. Hence, although it is preferable to use an omnidirectional antenna, a case of mmWave has a problem that channel characteristic rapidly changes according to a user location.

There are the above-mentioned problems due to the property of the mmWave technology that uses the omnidirectional antenna. Therefore, the present invention is directed to overcome the above problems and propose methods of increasing a cell range coverable by an omnidirectional antenna up to a range covered by a directional antenna.

2. Scanning Method for Directional Antenna 2.1 Beam Scanning Method

Beam scanning methods are schematically described as follows.

Figure 3:
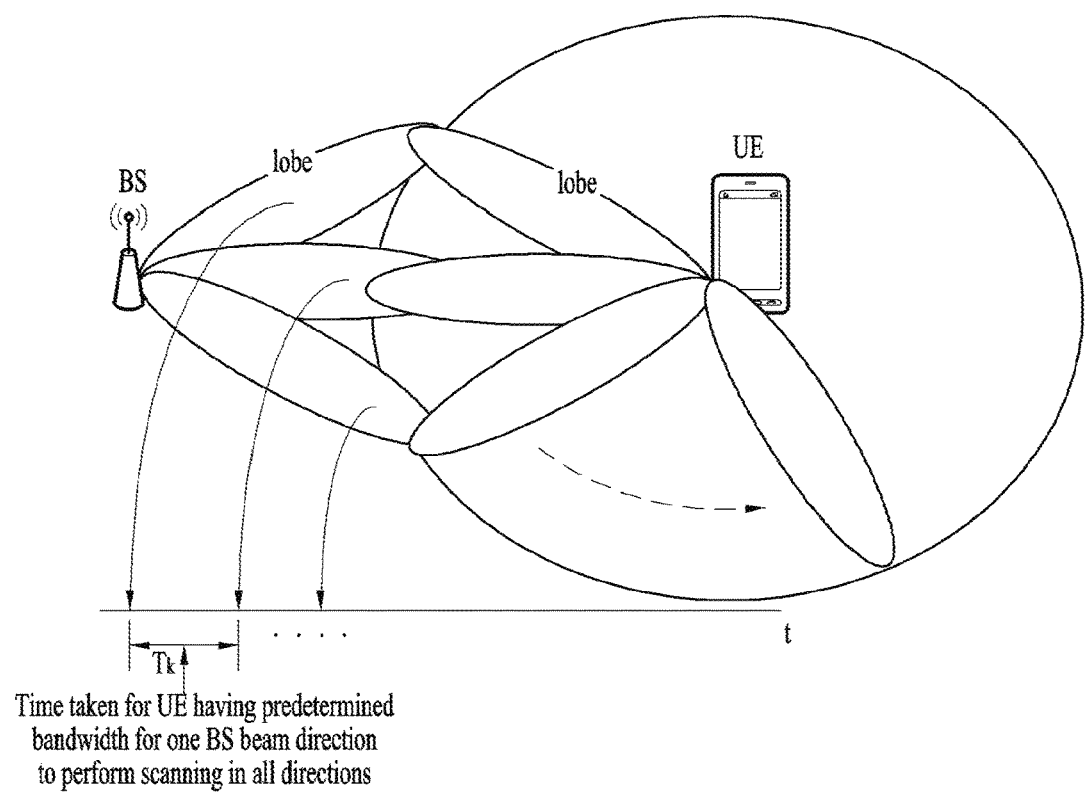
FIG. 3 is a diagram showing one example of an initial stage of a received beam scanning for a transmitted beam scanning.
Figure 4:
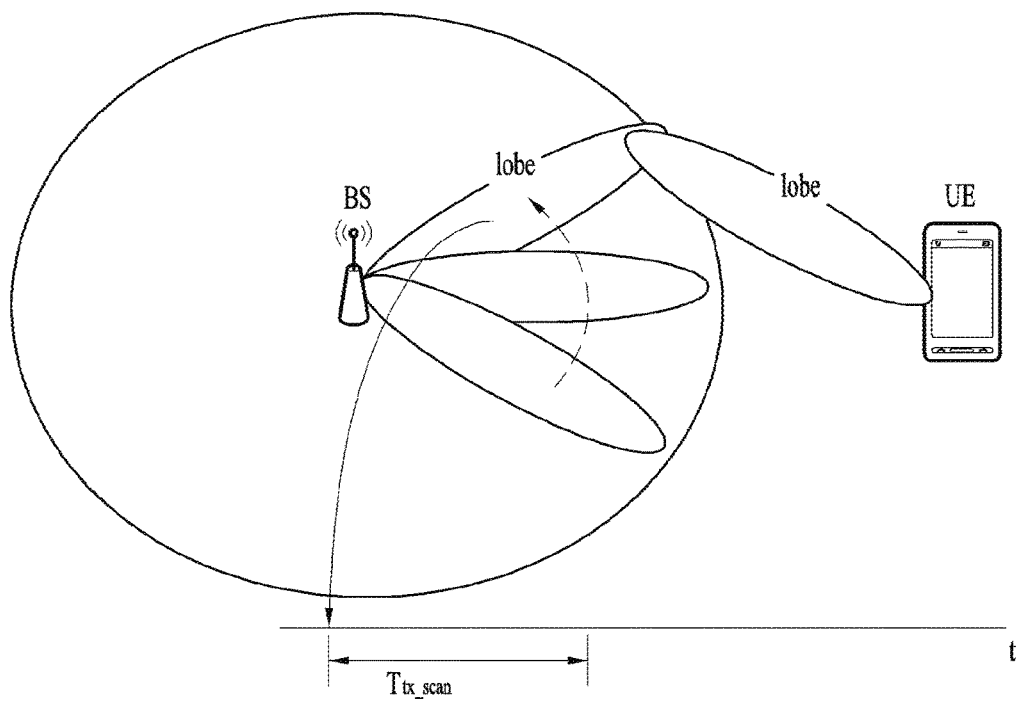
FIG. 4 is a diagram showing one of methods for performing a beam scanning in a transmitting end after fixing a received lobe index in a receiving side.

FIG. 3 is a diagram showing one example of an initial stage of a received beam scanning for a transmitted beam scanning FIG. 4 is a diagram showing one of methods for performing a beam scanning in a transmitting end after fixing a received lobe index in a receiving side.

If a transmitted beam codebook of a base station is determined in an initial stage of a beam scanning, while a corresponding transmitted beam is fixed, a receiving side, i.e., a user equipment derives a PDP (power delay profile) according to each beam by rotating a received beam scanning at 360°. In this case, the user equipment selects an index of a received lobe having a ray with a biggest power among the detected PDPs. Herein, the lobe means each radiation group in case that energy distribution of electric waves radiated from an antenna is divided in several directions. Namely, it means a prescribed form of a beam in performing a beam scanning.

Formula 1 is used to calculate SNR of each lobe detected by a user equipment.

$$\underset{i}{\operatorname{argmax}} |H_i^{(k)} w_i|^2 \frac{p_i^2}{\sigma_n^2} \qquad \text{[Formula 1]}$$

In Formula 1, $H_i^{(k)}$ means a radio channel of an $i^{th}$ lobe for a transmitted beam k, $w_i$ means a precoding matrix, $p_i$ means a received power, sigma ($\sigma$) means a size of noise, sigma square means a power of noise.

When a time for completing a received (Rx) beam scanning for a fixed transmitted (Tx) beam lobe is defined as $\tau_k$, as shown in FIG. 3, $\tau_k$ value may be defined as Formula 2.

$$\tau_k = N(\tau_{excess\_delay} + \tau_{prop\_delay} + \tau_{process\_delay}) \qquad \text{[Formula 2]}$$

In Formula 2, $\tau_{excess\_delay}$ is an excess delay spread value meaning a maximum delay time required for a receiving end to perform a beam scanning repeatedly, $\tau_{prop\_delay}$ is a transmission delay value, $\tau_{process\_delay}$ means a PDP measurement time for each received (Rx) beam lobe and a strong ray detection time, and N means the number of receiving side beam lobes.

The receiving end repeats the above process by changing the entire transmitted (Tx) beam lobes 1~K at 360°. Hence, a beam scanning complete time of the receiving end is $K\tau_k$. Herein, K means the number of the entire transmitted (Tx) beams.

Referring to FIG. 4, if a user equipment that is a receiving end completes a beam scanning, it sends a pilot signal to an mmWave base station again. Thereafter, the user equipment performs 360° beam scanning to determine a transmitting side lobe index. Hence, a time of completing a Tx/Rx beam scanning becomes $K\tau_t+\tau_{tx\_scan}$.

Table 4 defines parameters for beam scanning complete time measurement.

TABLE 4

| | |
|---|---|
| $\tau_{excess\_delay}$ | 1 us |
| $\tau_{prop\_delay}$ | 5 us |
| $\tau_{process\_delay}$ | 670 us |
| N (beamwidth = 36 degree) | 100 (vertical + horizontal) |
| K (beamwidth = 36 degree) | 100 (vertical + horizontal) |
| $\tau_{tx\_scan}$ | 100 * 670 us |

If parameters for a beam scanning are defined as Table 4, a total Tx/Rx beam scanning time becomes about 100*100*(1+5+670)+100*670=6.827 sec. Namely, it can be observed that overhead amounting to a considerably long time is generated.

Yet, channel characteristic varies according to user's instant motion in a narrow cell coverage due to mmWave property. If almost 7 seconds are consumed for the beam scanning, it causes a problem that an mmWave service appropriate for the varying channel characteristic cannot be provided. Therefore, for an mmWave link connection through a general beam scanning, a simpler processing method is required.

2.2 Ray Scanning Method

Figure 5:
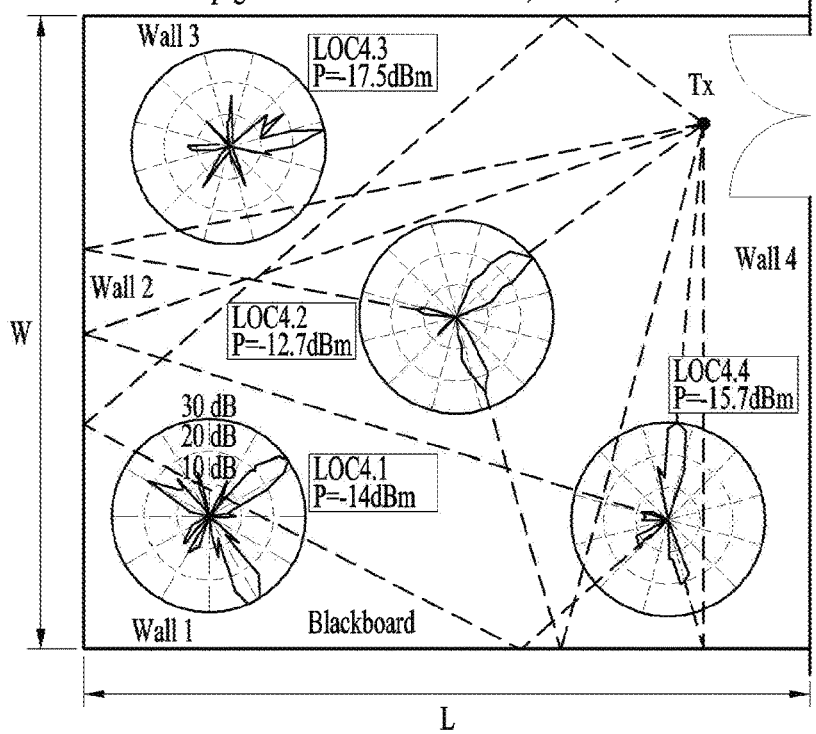
FIG. 5 is a diagram showing one example of PAS distribution according to a location of each transceiving end on 60 GHz band.
Figure 5:
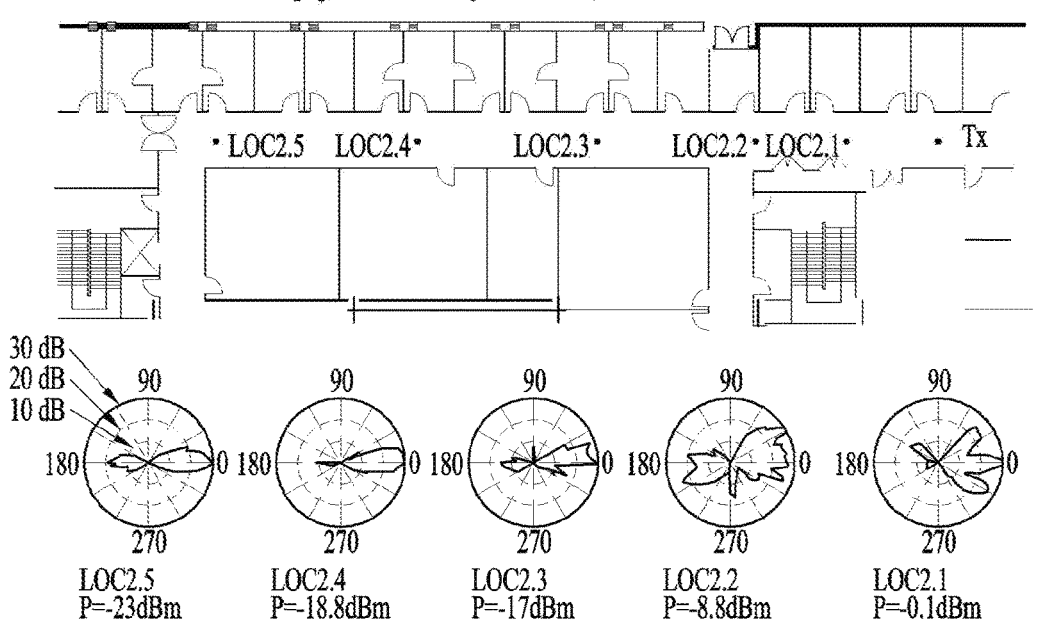

FIG. 5 is a diagram showing one example of PAS distribution according to a location of each transceiving end on 60 GHz band. Particularly, FIG. 5 (a) shows a measurement state of indoor AoA (angle of arrival) and FIG. 5 (b) shows a measurement state of AOA on a corridor in a building.

Like FIG. 5, according to the space environment property of a reception location. it can be observed that PAS indicating a power amount according to an antenna angle of a user equipment changes variously. In mmWave using a high frequency band, the environmental property of the user equipment appears more clearly in comparison with a low frequency band.

Figure 6:
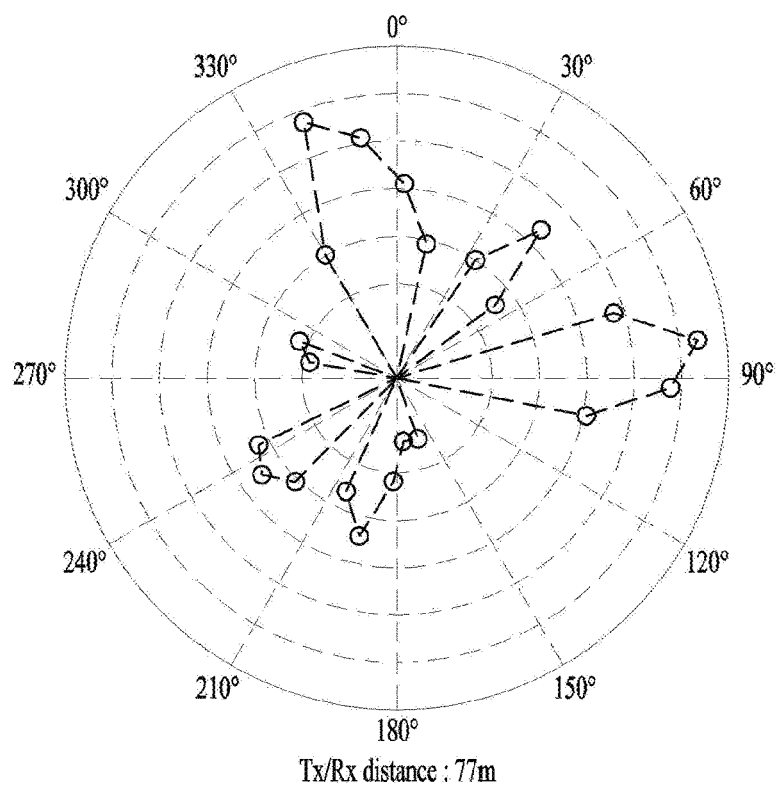
FIG. 6 is a diagram showing one example of PAS distribution according to a location of each transceiving end on 28 GHz band.
Figure 6:
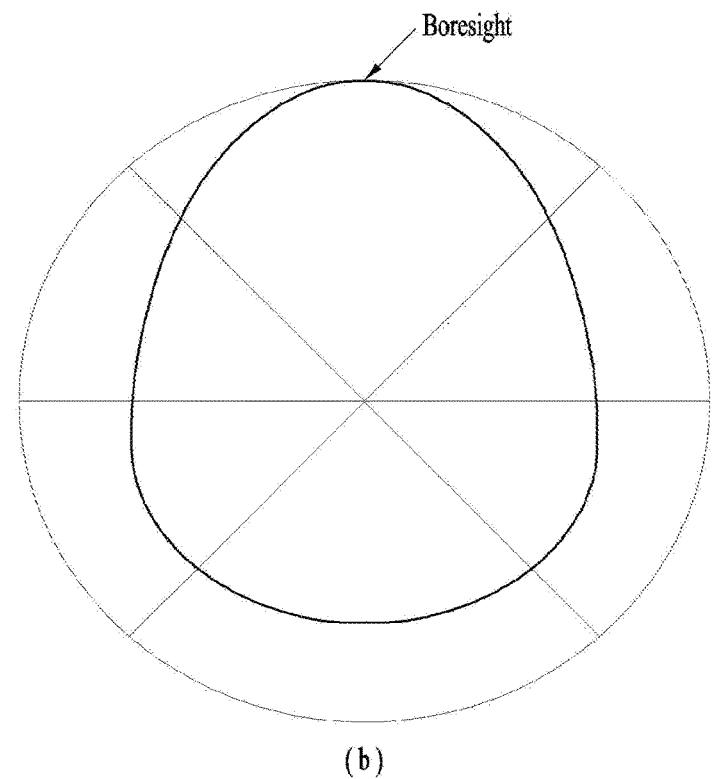

FIG. 6 is a diagram showing one example of PAS distribution according to a location of each transceiving end on 28 GHz band. FIG. 6 (a) shows a PAS measurement result in a city area corresponding to NLoS (non line of sight) environment and FIG. 6(b) shows a PAS measurement result in a general LoS (line of sight) environment.

Through measurement, Rappaport team shows that PAS is determined according to regional location features of a receiver in NLoS environment (i.e., situation that link is connected owing to reflection and refraction by buildings, etc.) on 28 GHz band similar to 60 GHz band. Such a result predicts that a reception power is sufficiently reduced if AoA is further twisted with reference to boresight in a general LoS environment and that a reception power change will appear for each AoA according to the environmental features.

Therefore, if an mmWave user equipment analyzes the unique features for a wireless environment through a scanning scheme based not on beamforming but on ray scanning, such an analysis can be usefully used as a tool for obtaining a lobe of a space candidate or the like on a beam scanning or providing information to enable a receiver to detect resolvable rays distributed variously.

2.3 Relation Between Unique Environmental Element (PDP/PAS) and Directional Antenna Using a directional antenna and beamforming in an mmWave system obtains a beam gain and should be basically accompanied to extend an mmWave cell boundary restricted by the mmWave unique property. Yet, the unique property of the mmWave link is changed due to the use of the directional antenna and the beamforming.

Figure 7:
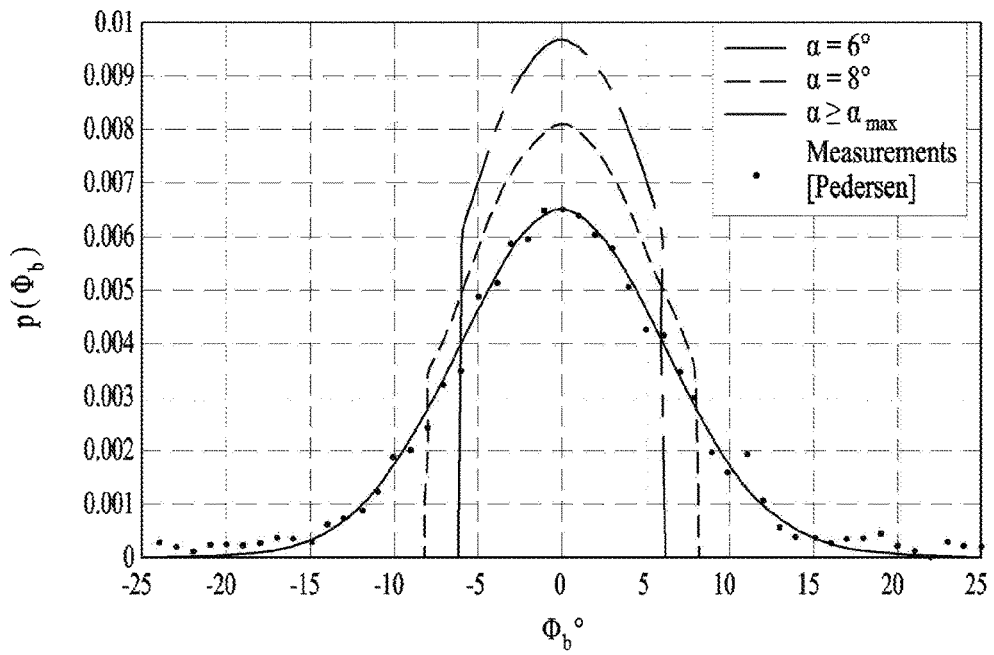
FIG. 7 is a diagram showing one example of effect for a directional antenna in an mmWave system.
Figure 7:
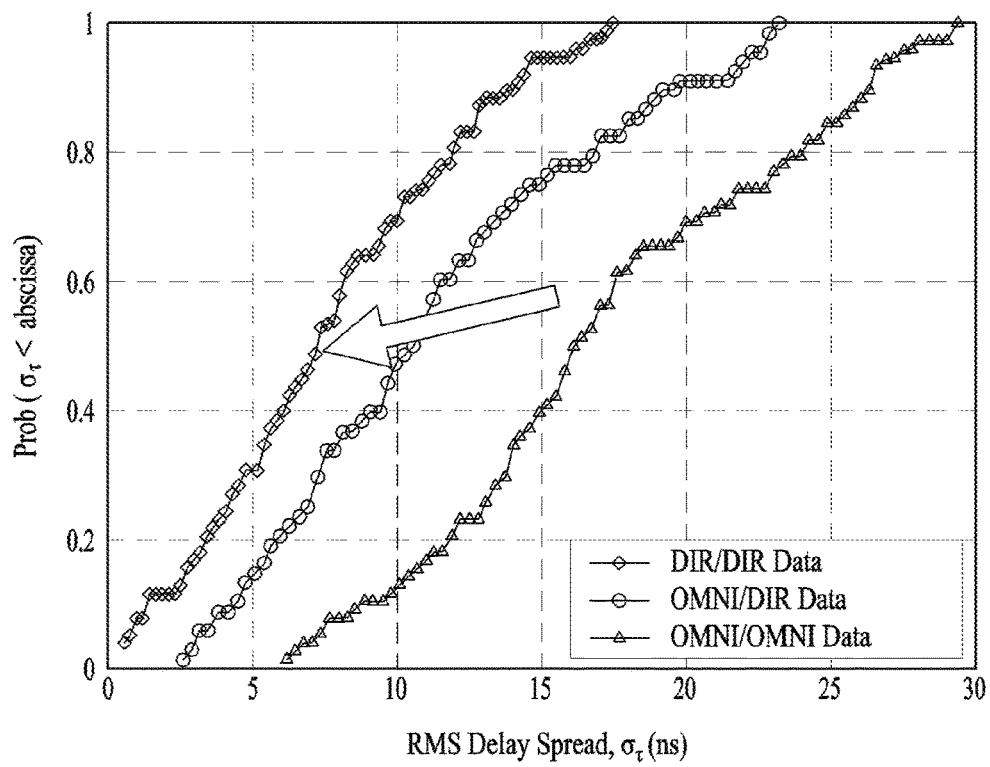

FIG. 7 is a diagram showing one example of effect for a directional antenna in an mmWave system. Particularly, FIG. 7 (a) shows a variation of PAS according to bandwidth, and FIG. 7 (b) shows RMS DS change by a directional antenna.

In FIG. 7 (a), α means a bandwidth. Generally, PAS has distributions of laplacian/uniform/Gaussian and the like according to the environmental features. Yet, since a range of the bandwidth is restricted due to the use of the directional antenna and the beamforming, the distribution is changed into truncated laplacian/Gaussian or the like.

Due to the limited AoA like FIG. 7 (b), a delay spread value is reduced as well. Hence, the environmental property in using a beamforming in an mmWave link cannot be regarded as the unique mmWave link environmental property.

Hence, for the environmental property analysis and information acquisition of the unique mmWave link, an omnidirectional antenna based ray scanning method is required.

2.4 Hierarchical Beam Scanning Method

Figure 8:
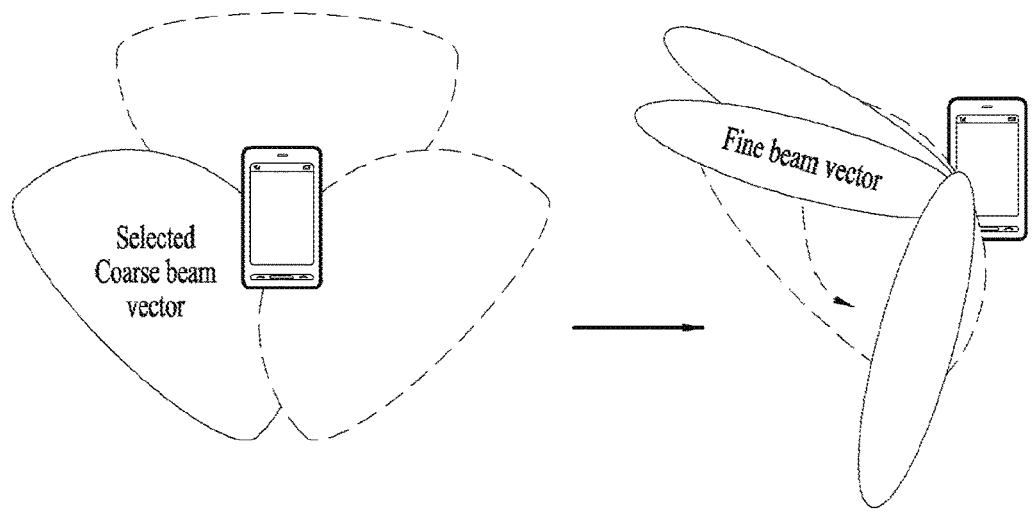
FIG. 8 is a diagram showing one of hierarchical beam scanning methods.

FIG. 8 is a diagram showing one of hierarchical beam scanning methods.

A hierarchical beam scanning method means a method of reducing a total scanning time by selecting a coarse beam vector and then using a fine beam vector.

Table 5 defines a parameter for hierarchical beam scanning complete time measurement.

TABLE 5

| | |
|---|---|
| $\tau_{excess\_delay}$ | 1 us |
| $\tau_{prop\_delay}$ | 5 us |
| $\tau_{process\_delay}$ | 670 us |
| $N_{Coarse}$ (beamwidth = 120 degree) | 9(vertical + horizontal) |
| $N_{fine}$ (beamwidth = 30 degree) | 16 per one coarse beam (vertical + horizontal) |
| K (beamwidth = 36 degree) | 100(vertical + horizontal) |
| $\tau_{tx\_scan}$ | 100 * 670 us |

Referring to FIG. 8, a user equipment determines a coarse beam having a range of 120°. Thereafter, it can be checked that a fine beam vector is scanned within the selected coarse beam. In case of using a hierarchical beam scanning method, a time of completing the hierarchical beam scanning can be determined as Formula 6.

$$\tau_k = (N_{Coarse}+N_{fine}) \times (\tau_{excess\_delay}+\tau_{prop\_delay}+\tau_{process\_delay})$$  [Formula 6]

Considering Table 5 and Formula 6, a total time for a user equipment to perform a hierarchical beam scanning is reduced into 100*(9+16)*676+100*670=1.757 sec. Although the total scanning time is reduced in comparison with a case of a general beam scanning, since a coarse beam scanning is in a state of being processed after becoming a coarse beam vector, it is disadvantageous in that a selected coarse beam vector is not usable in performing a scanning for a fine beam vector. Moreover, since a pre/pro-processing process of a beam is performed on transmission/reception, the hierarchical beam scanning method has difficulty in determining unique channel characteristics.

3. Hybrid Scanning Method in mmWave System

The present invention discloses methods of reducing overhead generated from a beam scanning by setting a candidate direction of a beam in case of the beam scanning based on information obtained through a ray scanning.

In case of performing a fine beam scanning after a coarse beam scanning like a hierarchical beam scanning, in order to compensate the difficulty in utilizing coarse beam vector information obtained from a coarse beam scanning process, according to embodiments of the present invention, it is able to perform a ray scanning to obtain unique channel information instead of a coarse beam scanning. An mmWave user equipment (UE) can reduce a beam scanning overhead and a total scanning time by obtaining candidate fine beam vectors using the unique channel information obtained through the ray scanning.

Figure 9:
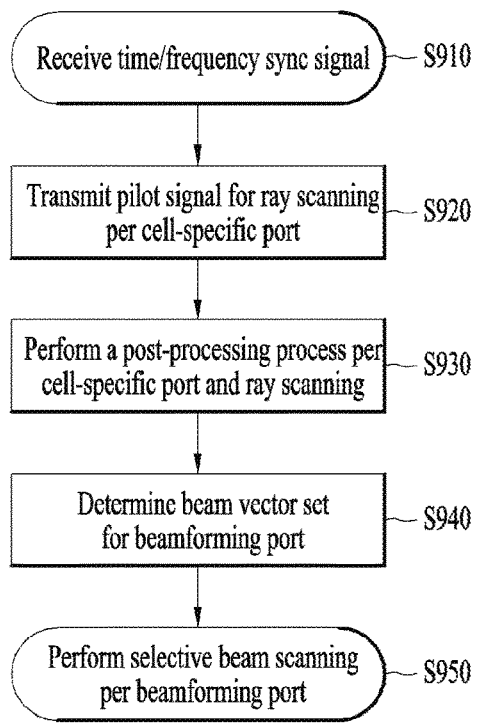
FIG. 9 is a flowchart for performing a hybrid scanning method used in an mmWave system.

FIG. 9 is a flowchart for performing a hybrid scanning method used in an mmWave system.

Referring to FIG. 9, an mmWave base station transmits a time/frequency synchronization signal to match time and frequency synchronization with an mmWave user equipment [S910].

The base station transmits different pilot signals to perform a ray scanning per cell-specific port [S920].

In the step S920, the different pilot signals per cell-specific port may be transmitted repeatedly or by predetermined periods.

The user equipment corresponding to a receiving side performs a post-processing process per cell-specific port and a ray scanning based on the received pilot signal [S930].

Moreover, in order to determine a beamforming port for a beamforming to be performed in a hybrid scanning, the user equipment determines one or more candidate beam vector sets [S940].

Thereafter, the user equipment may perform a selective beam scanning per beamforming port with the base station [S950].

Namely, the user equipment may transmit a pilot signal to the base station using the beamforming port selected in the step S950. Moreover, by detecting the pilot signal transmitted per candidate beamforming port transmitted by the user equipment, the base station may perform the selective beam scanning.

As a hybrid scanning method, in an mmWave system, a base station and/or user equipment may perform a ray scanning and a beam scanning together. For instance, the base station and/or user equipment transceives a pilot signal for performing a ray scanning, performs the ray scanning using the pilot signal, obtains candidate vector sets, and then performs a beam scanning within the candidate beam vector sets.

In FIG. 9, after transmitting the time/frequency synchronization signal according to the step S910, the base station can information each user equipment of a pilot index and a resource pool index that will be transmitted from the user equipment to the base station. In this case, when the pilot signal is transmitted to each user equipment to perform a ray scanning, the pilot index and the resource pool index are multiplexed with pilot signals per cell-specific port by CDM, thereby indicating a pilot signal to be transmitted by the user equipment and a location of a resource that will carry the corresponding pilot signal.

Figure 10:
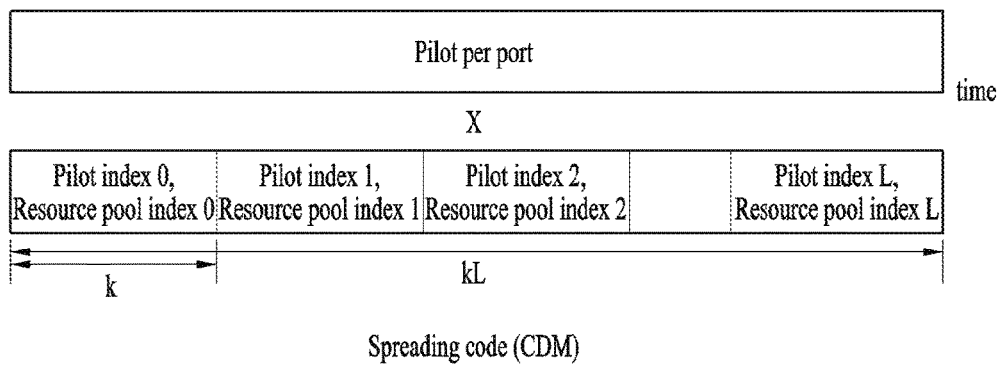
FIG. 10 is a diagram showing one of methods of transmitting a pilot index and a resource pool assignment index per cell-specific antenna port using CDM.

FIG. 10 is a diagram showing one of methods of transmitting a pilot index and a resource pool assignment index per cell-specific antenna port using CDM.

Like FIG. 10, in case of transmitting a ray scanning pilot signal, a base station transmits an uplink beamforming pilot index and a resource location index (i.e., resource pool index) for indicating a location of an uplink scanning zone through CDM. A base station and user equipments already know a pilot transmitted on performing a ray scanning (advanced settings assumed), and are able to detect index informations transmitted by CDM through it.

For instance, if a pilot sequence is defined as x(n), a received pilot signal can be represented as Formula 7.

$$y(n)=h(n)[x(n) \otimes c(n)]+w(n) \qquad \text{[Formula 7]}$$

In Formula 7, since a user equipment already knows a received pilot signal y(n) and a pilot sequence x(n) transmitted by a base station, it is able to estimate c(n) through Formula 8. The c(n) means pilot index information and resource pool index information coded in the pilot sequence x(n). In Formula 7, the operator $\otimes$ is a sort of a coding operator and may refer to FIG. 10. In this case, the CDM scheme is one embodiment of Formula 7.

$$n_k \underset{c(n)}{\operatorname{argmin}} \|y(n)-x(n)\|^2 \qquad \text{[Formula 8]}$$

In FIG. 10, assume a case that a length of a pilot index and a resource pool index is k and is divided into L. In this case, a total length of a pilot sequence is kL, where k and L can be set through upper layer signaling beforehand.

In the embodiments of the present invention, regarding a resource pool, a base station beforehand sets a transmission region of a pilot signal to be transmitted in uplink. For instance, when a user equipment transmits an uplink pilot signal through a candidate beamforming port after a ray scanning and a beam scanning, a base station considers a propagation delay of the corresponding pilot signal and may detect an uplink pilot signal from a resource pool indicated by a resource pool index.

3.1 mmWave Ray Scanning Receiving Method of UE

Figure 11:
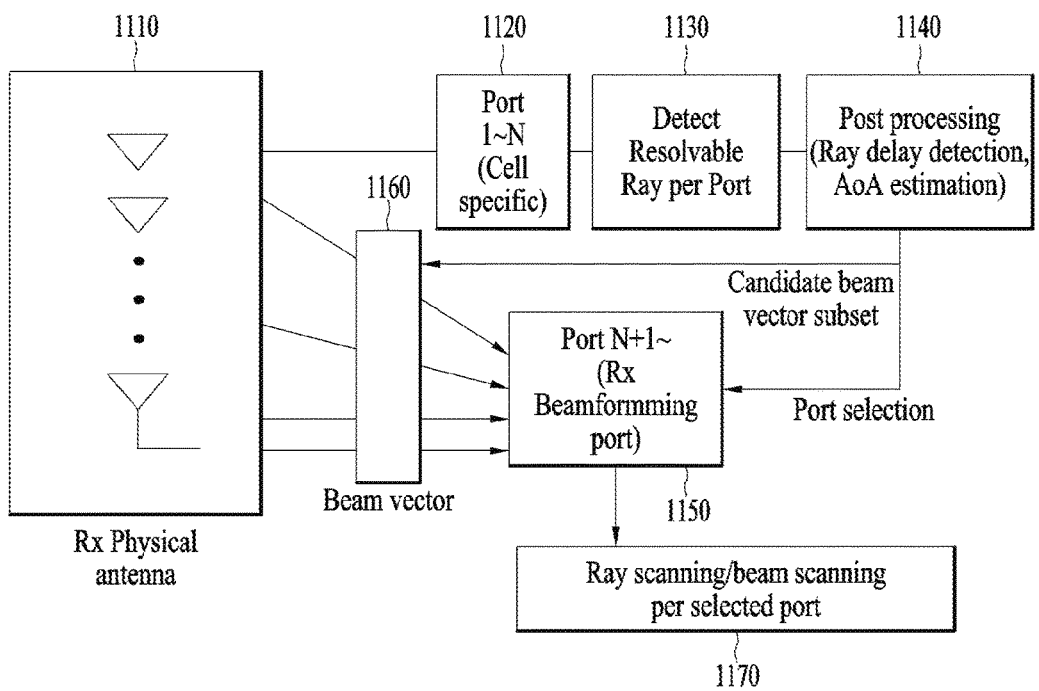
FIG. 11 is a diagram showing one example of a device configuration for an mmWave UE to perform a hybrid scanning.

FIG. 11 is a diagram showing one example of a device configuration for an mmWave UE to perform a hybrid scanning.

Referring to FIG. 11, a user equipment has X Rx physical antennas 1110 and the number of cell-specific antenna ports can be set up to N. herein, the mapping relation between the physical antenna and the Rx antenna port can be managed by an antenna port unit 1120. The user equipment includes a detecting unit 1130 for detecting a resolvable ray per antenna port and a post processing unit 1140 for estimating a delay value and AoA of the detected ray. The post processing unit delivers a candidate beam vector subset to the beam vector processing unit 1160, thereby supporting reception of a pilot signal. A Rx beamforming port unit 1150 can perform a beamforming using a port selected by the post processing unit. Namely, a processor 1170 of the user equipment can perform a ray or beam scanning per selected port.

For the detection of a resolvable ray per Tx antenna port, a base station sets a threshold of a transmit power and obtains a candidate received beam vector subset through AoA histogram obtained per cell-specific antenna port.

Thereafter, the base station determines a Tx antenna port to which a biggest power will be assigned.

In this case, Tx antenna ports sorted by TDM or FDM per cell-specific Rx antenna port of the user equipment can be assorted. The user equipment selects a Tx antenna port having a biggest received signal, thereby receiving data through the corresponding Tx antenna port.

3.2 Method of Transmitting Pilot Signal from mmWave Beamforming Port

After the step S950, a time of transmitting a pilot signal per beamforming port from a receiving side, i.e., a user equipment to a base station is a time of determining a candidate beam vector per full beamforming ports. The time of transmitting the pilot signal per beamforming port may be set in advance through upper layer signaling (e.g., RRC).

Figure 12:
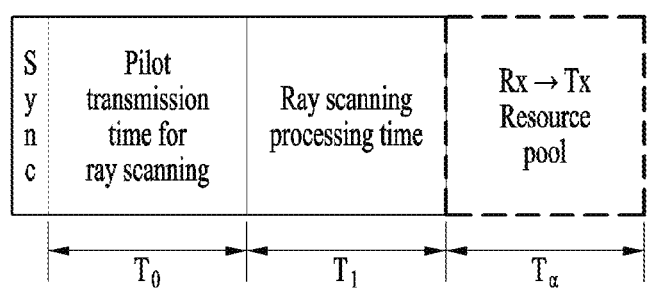
FIG. 12 is a diagram showing one of methods of transmitting a pilot signal per beamforming port.

FIG. 12 is a diagram showing one of methods of transmitting a pilot signal per beamforming port.

Referring to FIG. 12, a base station transmits a synchronization signal first. Thereafter, the base station transmits a pilot signal per cell-specific port for a ray scanning during a time $T_0$. $T_1$ means a time for processing a ray scanning in a user equipment. $T_a$ means a time for transmitting a pilot signal from a user equipment to a base station on a region indicated by a resource pool index through a beam scanning port.

Namely, since the user equipment is in a state of having time synchronization matched with the base station on performing a ray scanning, it is able to determine a transmission start time of a and a transmission time $T_a$ of a pilot signal per beamforming port after a transmission time $T_0$ for transmitting a pilot for a ray scanning to a receiving side and a time $T_1$ for estimating and processing candidate beam vector sets after performing a ray scanning.

The reason for the user equipment to determine a start time of a resource pool and a length thereof is that a transmission length of an uplink pilot signal may vary according to characteristic of a channel. Since the user equipment may be aware of the uplink channel characteristic first, the user equipment can adjust the length of the pilot signal. In doing so, the user equipment preferably determines a transmission start time of the pilot signal by referring to a resource pool index. Namely, since the base station already knows an assigned location of a resource pool according to a resource pool index, the base station can easily perform a blind searching for pilot signal detection. In aspect of complexity, since it is enough for the base station to try an uplink pilot signal detection within a corresponding resource pool only, it is advantageous in that the base station does not have to decode other resources.

Figure 13:
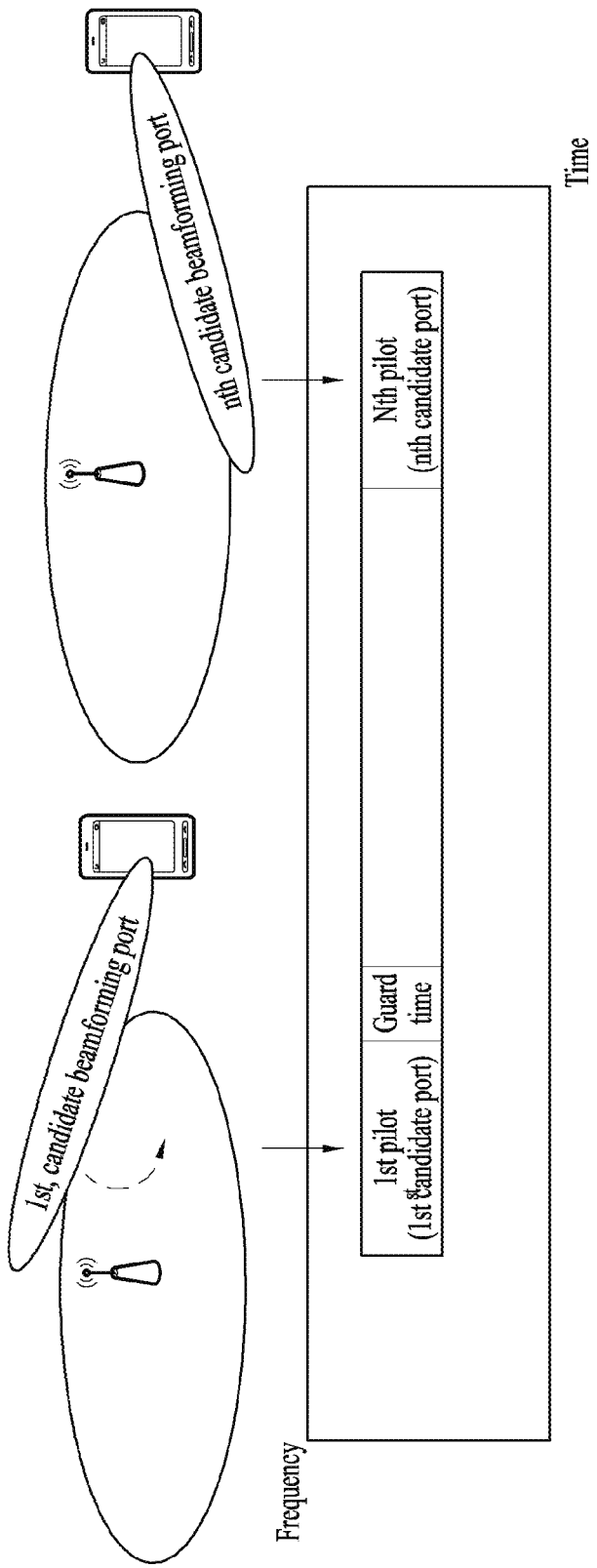
FIG. 13 is a diagram showing one of methods for a user equipment to transmit a pilot signal to a candidate beamforming port.

FIG. 13 is a diagram showing one of methods for a user equipment to transmit a pilot signal to a candidate beamforming port.

Referring to FIG. 13, an uplink scanning zone for an uplink blind beam search may be checked through frequency and time domains. A user equipment transmits to a base station a pilot index indicated by a pilot index in FIG. 10 on an uplink scanning zone through a first port among candidate beamforming ports. In doing so, by leaving a guard time after transmitting a pilot signal per candidate beamforming port, it is able to prevent interference and overlapping between pilot signals.

In order for the base station to blind-decode the pilot signal per candidate beamforming port transmitted by the user equipment, an uplink blind scanning zone may be set as FIG. 13. Resource allocation for other user equipments having links connected to the base station within the blind scanning zone is prohibited. A location of the uplink blind scanning zone may be set through RRC signaling.

In order to be discriminated from a normal user equipment beam-scanned by a corresponding base station, an mmWave user equipment may obtain a pilot index and a resource pool index through CDM previously received on ray-scanning a resource pool randomly [See FIG. 10].

According to embodiments of the present invention, pilot signals transmitted by a user equipment through candidate beamforming ports for a beam scanning may be transmitted in form of repetition. For instance, the user equipment may transmit a prescribed number of pilot signals consecutively or may transmit pilot signals through all candidate beamforming ports by prescribed periods.

Figure 14:
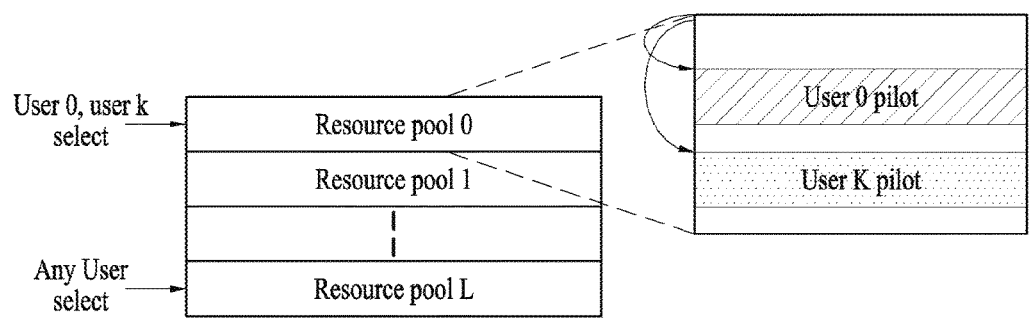
FIG. 14 is a diagram showing one of methods for a user equipment to select a resource pool index.

FIG. 14 is a diagram showing one of methods for a user equipment to select a resource pool index.

Referring to FIG. 14, in order to prevent collision of pilot signal transmissions of user equipments within a selected resource pool, each of the user equipments may set a frequency offset $n_k$ randomly. Namely, a pilot signal transmitted by each user equipment within a single resource pool may be transmitted in a manner of being divided in a frequency domain according to a frequency offset. A base station blind-searches the respective resource pools and measures power for a beam scanning.

When a user equipment transmits pilot signals, in order to overlapping of pilot signals due to multi ray path, it is able to leave a guard time amounting to a maximum delay (Excess Delay). A guard region may be assigned between resource pool indexes for a selective beamforming in an uplink blind scanning zone for a guard time, as shown in FIG. 13.

In the embodiments of the present invention, a pilot signal transmitted for a ray scanning by a base station may be named a first pilot or a first pilot signal. And, a pilot signal transmitted for a beam scanning by a user equipment may be named a second pilot or a second pilot signal.

5. Implementation Device

Figure 15:
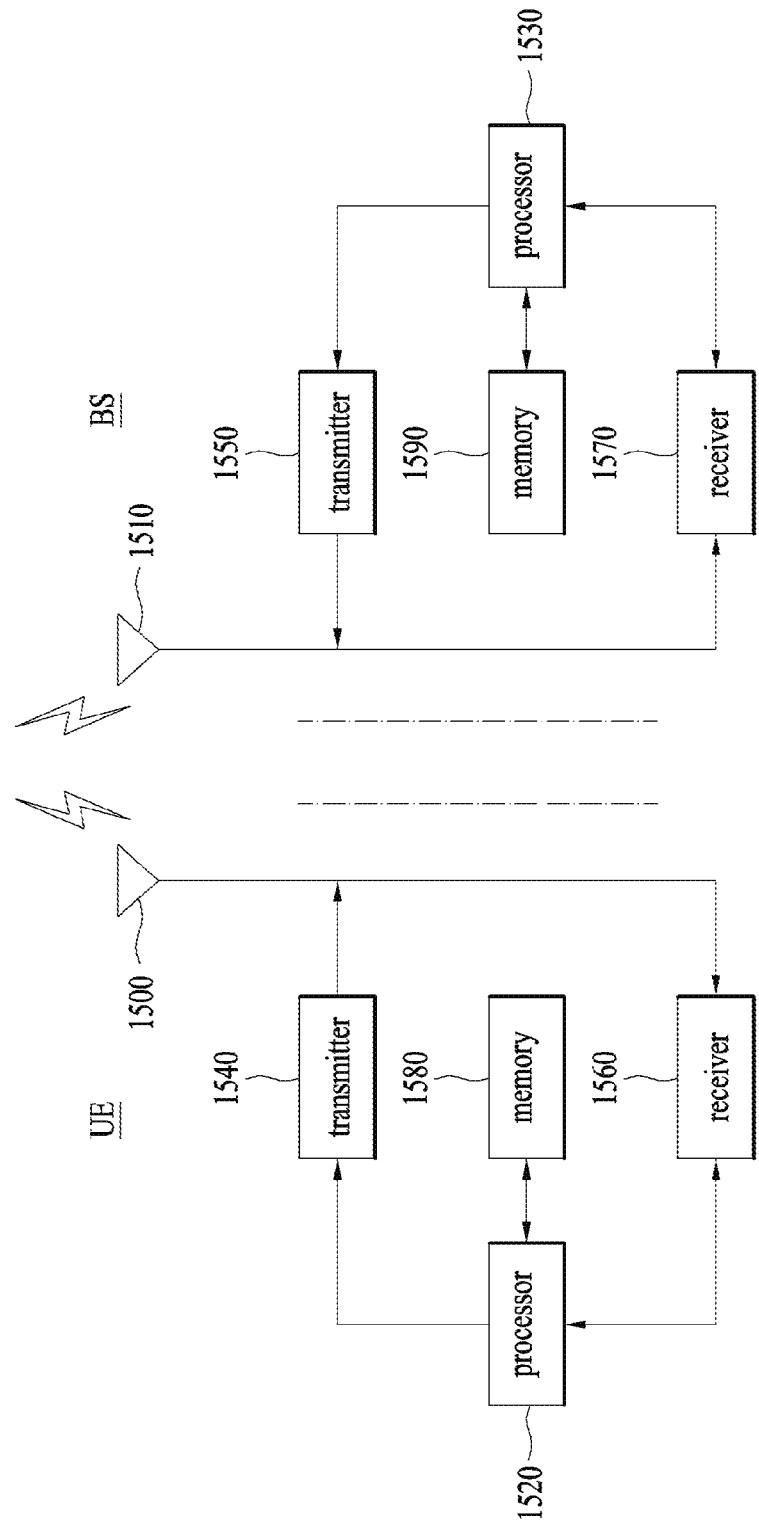
FIG. 15 is a diagram of a device that is a means for implementing the methods described with reference to FIGS. 1 to 14.

A device described in FIG. 15 is a means for implementing the methods described with reference to FIGS. 1 to 14.

A UE (user equipment) can operate as a transmitter in uplink or a receiver in downlink. A BS (base station) (eNB: e-Node B) can operate as a receiver in uplink or a transmitter in downlink.

Namely, the UE/BS may include a Tx module 1540/1550 and a Rx module 1550/1570 to control transmission and reception of data and/or messages, and may further include an antenna 1500/1510 and the like to transmit and receive information, data and/or messages.

The UE/BS may include a processor 1520/1530 for performing embodiments of the present invention mentioned in the foregoing description and a memory 1580/1590 for storing a processing process of the processor temporarily or consistently.

The embodiments of the present invention can be performed using the components and functions of the UE and BS devices. For instance, the processor of the BS can perform a synchronization signal transmission and a pilot signal transmission required for mmWave ray scanning in the course of a hybrid scanning process using the methods described in the above mentioned first to third paragraphs. And, the user equipment generates different pilot signals per candidate beamforming port for a beam scanning in the course of the hybrid scanning process and then transmits them to the base station. In doing so, the pilot signals transmitted by the user equipment are selected from pilot indexes multiplexed with pilot signals in the ray scanning process and the selected pilot signal can be transmitted through a region indicated by a resource index. For details, contents of the first to third paragraphs can be referred to.

The Tx and Rx modules included in the UE/BS can perform a packet modulation/demodulation function for data transmission, a fast packet channel coding function, OFDMA (orthogonal frequency division multiple access) packet scheduling, TDD (Time Division Duplex) packet scheduling and/or a channel multiplexing function. Moreover, the UE/BS of FIG. 15 may further include a low power RF/IF (Radio Frequency/Intermediate Frequency) module.

Meanwhile, in the present invention, a user equipment may use a PDA (Personal Digital Assistant), a cellular phone, a PCS (Personal Communication Service) phone, a GSM (Global System for Mobile) phone, a WCDMA (Wideband CDMA) phone, an MBS (Mobile Broadband System) phone, a hand-held PC, a notebook PC, a smart phone, a MM-MB (Multi Mode-Multi Band) terminal or the like.

Herein, the smart phone is a user equipment having the mixed benefits of a mobile communication terminal and a PDA, and may mean a terminal in which PDA's data communication functions such as schedule management, fax transmission/reception, internet access and the like are integrated are integrated with the mobile terminal. Moreover, the MM-MB terminal means a terminal operational in a mobile internet system and other mobile communication systems (e.g., CDMA (Code Division Multiple Access) 2000 system, WCDMA (Wideband CDMA) system, etc.) by having a multi-modem chip built inside.

Embodiments of the present invention may be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in the memory unit 1580/1590 and is then drivable by the processor 1520/1530. The memory unit is provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The embodiments of the present are applicable to various wireless access systems. Examples of the various wireless access systems include 3GPP (3rd Generation Partnership Project) system, 3GPP2 system and/or IEEE 802.xx (Institute of Electrical and Electronic Engineers 802) system and the like. The embodiments of the present are applicable to all technical fields having the various wireless access systems applied thereto as well as to the various wireless access systems.

What is claimed is:

1. A method of performing a hybrid scanning in a wireless access system supportive of a millimeter wave technology, comprising:
receiving a synchronization signal to match synchronization with a base station;
matching the synchronization with the base station using the synchronization signal;
receiving first pilot signals having different configuration patterns per transmitting antenna port from the base station, the first pilot signals for a ray scanning;
performing the ray scanning using the first pilot signals;
selecting a candidate beamforming port set through the ray scanning;
generating second pilot signals having different configuration patterns per candidate beamforming port included in the candidate beamforming port set; and
transmitting the second pilot signals to the base station to perform a beam scanning with the base station,
wherein the first pilot signals are multiplexed with:
a pilot index for generating the second pilot signals, and
a resource pool index indicating a resource region carrying the second pilot signals.

2. The method of claim 1, wherein the second pilot signals are transmitted to the base station through the resource region indicated by the resource pool index.

3. The method of claim 1, wherein the first pilot signals are transmitted in form of repetition.

4. The method of claim 1, wherein the second pilot signals are transmitted in form of repetition.

5. A user equipment performing a hybrid scanning in a wireless access system supportive of a millimeter wave technology, comprising:
a receiver;
a transmitter; and
a processor configured to support the hybrid scanning, wherein the processor is further configured to:
receive a synchronization signal to match synchronization with a base station by controlling the receiver,
match the synchronization with the base station using the synchronization signal,
receive first pilot signals having different configuration patterns per transmitting antenna port from the base station by controlling the receiver, the first pilot signals for a ray scanning,
perform the ray scanning using the first pilot signals,
select a candidate beamforming port set through the ray scanning,
generate second pilot signals having different configuration patterns per candidate beamforming port included in the candidate beamforming port set, and
transmit the second pilot signals to the base station to perform a beam scanning with the base station,
wherein the first pilot signals are multiplexed with:
a pilot index for generating the second pilot signals, and
a resource pool index indicating a resource region carrying the second pilot signals.

6. The user equipment of claim 5, wherein the second pilot signals are transmitted to the base station through the resource region indicated by the resource pool index.

7. The user equipment of claim 5, wherein the first pilot signals are transmitted in form of repetition.

8. The user equipment of claim 5, wherein the second pilot signals are transmitted in form of repetition.

\* \* \* \* \*